(12) United States Patent
Chakraborty et al.

(10) Patent No.: US 10,417,719 B2
(45) Date of Patent: Sep. 17, 2019

(54) ELECTRIC ENERGY ADJUSTMENT APPARATUS, SYSTEM, METHOD AND PROGRAM

(71) Applicant: NEC CORPORATION, Tokyo (JP)

(72) Inventors: Shantanu Chakraborty, Tokyo (JP); Toshiya Okabe, Tokyo (JP)

(73) Assignee: NEC CORPORATION, Minato-Ku, Tokyo (JP)

( * ) Notice: Subject to any disclaimer, the term of this patent is extended or adjusted under 35 U.S.C. 154(b) by 62 days.

(21) Appl. No.: 15/547,248

(22) PCT Filed: Feb. 23, 2015

(86) PCT No.: PCT/JP2015/000866
§ 371 (c)(1),
(2) Date: Jul. 28, 2017

(87) PCT Pub. No.: WO2016/135771
PCT Pub. Date: Sep. 1, 2016

(65) Prior Publication Data
US 2018/0025443 A1 Jan. 25, 2018

(51) Int. Cl.
G06Q 50/06 (2012.01)
G05B 15/02 (2006.01)
H02J 3/00 (2006.01)

(52) U.S. Cl.
CPC ............ *G06Q 50/06* (2013.01); *G05B 15/02* (2013.01); *H02J 3/008* (2013.01)

(58) Field of Classification Search
CPC ......... G05B 15/02; G06Q 50/06; H02J 3/008; Y10T 307/461
See application file for complete search history.

(56) References Cited

U.S. PATENT DOCUMENTS

2003/0074304 A1 4/2003 Okada
2004/0093298 A1 5/2004 McClure, III et al.
(Continued)

FOREIGN PATENT DOCUMENTS

EP 1 294 071 A2 3/2003
GB 2494658 A 3/2013
(Continued)

OTHER PUBLICATIONS

International Search Report for PCT/JP2015/000866, dated Jul. 28, 2015 (PCT/ISA/210).
(Continued)

*Primary Examiner* — Kenneth M Lo
*Assistant Examiner* — Chad G Erdman
(74) *Attorney, Agent, or Firm* — Sughrue Mion, PLLC

(57) ABSTRACT

A Service Provider (SP) includes a controller that instructs several Producers (provide the electric energy) and Consumers (consume the electric energy) about the electrical energy. The controller selects one of the Producers as an Active Producer (AP) that provides a predetermined volume of the electric energy, one of a remainder of the Producers as a Passive Producer (PP) that adjusts a volume of provided electric energy to be, one of the Consumers as an Active Consumer (AC) that consumes a predetermined volume of the electric energy, and one of a remainder of the Consumers as a Passive Consumer (PC) that adjusts a volume of consumed electric energy, and the controller instructs one of Passive Subscribers (either the PP or the PC) to adjust the electric energy, so as to mitigate a difference between a total supply volume and a total demand volume.

10 Claims, 11 Drawing Sheets

(56) References Cited

U.S. PATENT DOCUMENTS

| | | | |
|---|---|---|---|
| 2006/0155423 A1 | 7/2006 | Budike, Jr. | |
| 2009/0228388 A1 | 9/2009 | Axelrod et al. | |
| 2010/0308765 A1* | 12/2010 | Moore | H02J 7/0013 320/103 |
| 2011/0137482 A1* | 6/2011 | Toba | H02J 3/46 700/291 |
| 2012/0286524 A1* | 11/2012 | Bronicki | F01K 13/02 290/40 B |
| 2013/0204761 A1 | 8/2013 | Smith | |
| 2013/0304275 A1 | 11/2013 | Lee et al. | |
| 2013/0342020 A1* | 12/2013 | Blevins | H02J 4/00 307/84 |
| 2014/0336835 A1* | 11/2014 | Bloor | H02J 3/14 700/295 |
| 2015/0349525 A1* | 12/2015 | Fang | H02J 1/00 307/18 |

FOREIGN PATENT DOCUMENTS

| | | |
|---|---|---|
| WO | 02/101510 A2 | 12/2002 |
| WO | 2013/030937 A1 | 3/2013 |

OTHER PUBLICATIONS

Written Opinion of the International Searching Authority for PCT/JP2015/000866, dated Jul. 28, 2015 (PCT/ISA/237).

\* cited by examiner

ELECTRIC ENERGY ADJUSTMENT APPARATUS, SYSTEM, METHOD AND PROGRAM

CROSS REFERENCE TO RELATED APPLICATIONS

This application is a National Stage of International Application No. PCT/JP2015/000866 filed Feb. 23, 2015, the contents of all of which are incorporated herein by reference in their entirety.

TECHNICAL FIELD

The present invention relates to an electric energy adjustment apparatus, system, method and program. In particular, the present invention relates to an electric energy adjustment apparatus, system, method and program for adjusting the electric energy.

BACKGROUND ART

A technique related to an "Automated Energy Management System" is disclosed in Patent Literature 1. A technique related to a "System Architecture and Method for Energy Industry Trading and Transaction Management" is disclosed in Patent Literature 2. A technique related to a "System and Method for Automated Trading of Electrical Consumption" is disclosed in Patent Literature 3. A technique related to a "Method for Providing Energy Commodities Trade Outsourcing Service within the Energy Market" is disclosed in Patent Literature 4. A technique related to an "Electric Power Trading Market System and Electric Power Trading Method" is disclosed in Patent Literature 5. A technique related to an "Energy Management System and Method" is disclosed in Patent Literature 6.

Moreover, a technique related to a "regional electric power control system and regional electric power control method" is disclosed in Patent Literature 7. In Patent Literature 7, each consumer possesses the ability to consume surplus electric power. The controller in Patent Literature 7 selects from among all the consumers a consumer to consume the surplus electric power.

CITATION LIST

Patent Literature

PTL 1: US Patent Publication No. 2006/0155423
PTL 2: International Patent Publication No. WO 02/101510
PTL 3: US Patent Publication No. 2009/0228388
PTL 4: US Patent Publication No. 2004/0093298
PTL 5: US Patent Publication No. 2003/0074304
PTL 6: US Patent Publication No. 2013/0304275
PTL 7: International Patent Publication No. WO 2013/030937

SUMMARY OF INVENTION

Technical Problem

According to Patent Literature 7, as described above, there is a possibility that all consumers could be selected as adjustment targets of the electric power (or energy). Therefore, according to Patent Literature 7, there is a problem that it is difficult to flexibly adjust the electric energy between a plurality of consumers and providers, such as, for example, maintaining a specific power consumption by a specific consumer.

The present invention has been accomplished to solve the above problems and thus an exemplary object of the present invention is to provide an electric energy adjustment apparatus, a system, a method and a program that enable the electric energy between a plurality of consumers and providers to be flexibly adjusted.

Solution to Problem

An electric energy adjustment apparatus according to a first exemplary aspect of the present invention includes a controller that instructs a plurality of Producers and Consumers about electrical energy, the Producers provide the electric energy, the Consumers consume the electric energy wherein the controller selects at least one of the plurality of Producers as an Active Producer that provides a predetermined volume of the electric energy, at least one of a remainder of the plurality of Producers as a Passive Producer that adjusts a volume of the energy to be provided, at least one the plurality of Consumers as an Active Consumer that consumes a predetermined volume of the electric energy, and at least one of a remainder of the plurality of Consumers as a Passive Consumer that adjusts a volume of the electric energy to be consumed, and the controller instructs at least one of Passive Subscribers, which is at least one of either the Passive Producer or the Passive Consumer, to adjust the electric energy, so as to mitigate a difference between a total volume of the electric energy provided by the plurality of Producers and a total volume of the electric energy consumed by the plurality of Consumers.

An electric energy adjustment system according to a second exemplary aspect of the present invention includes a plurality of Producers that provide electric energy, a plurality of Consumers that consume the electric energy, and a control apparatus that instructs the plurality of Producers and Consumers about the electrical energy; wherein at least one of the plurality of Producers is an Active Producer that provides a predetermined volume of the electric energy, at least one of a remainder of the plurality of Producers is a Passive Producer that adjusts a volume of the electric energy to be provided, at least one of the plurality of Consumers is an Active Consumer that consumes a predetermined volume of the electric energy, at least one of a remainder of the plurality of Consumers is a Passive Consumer that adjusts a volume of the electric energy to be consumed, and the control apparatus instructs at least one of Passive Subscribers, which is at least one of either the Passive Producer or the Passive Consumer, to adjust the electric energy, so as to mitigate a difference between a total volume of the electric energy provided by the plurality of Producers and a total volume of the electric energy consumed by the plurality of Consumers.

In an electric energy adjustment method according to a third exemplary aspect of the present invention, the method uses a plurality of Producers that provide electric energy, a plurality of Consumers that consume the electric energy, and a controller that instructs the plurality of Producers and Consumers about the electrical energy, and the electric energy adjustment method includes selecting, by the controller, at least one of the plurality of Producers as an Active Producer that provides a predetermined volume of the electric energy, at least one of a remainder of the plurality of Producers as a Passive Producer that adjusts a volume of the electric energy to be provided, at least one of the plurality of Consumers as an Active Consumer that consumes a predetermined volume of the electric energy, and at least one of a remainder of the plurality of Consumers as a Passive Consumer that adjusts a volume of the electric energy to be consumed; and instructing, by the controller, at least one of Passive Subscribers, which is at least one of either the Passive Producer or the Passive Consumer, to adjust the electric energy, so as to mitigate a difference between a total volume of the electric energy provided by the plurality of Producers and a total volume of the electric energy consumed by the plurality of Consumers.

In a non-transitory computer readable medium storing a control program according to a fourth exemplary aspect of the present invention, the control program causes a computer to execute a selection processing of selecting at least one of a plurality of Producers which provide electric energy, as an Active Producer that provides a predetermined volume of the electric energy, at least one of a remainder of the plurality of Producers as a Passive Producer that adjusts a volume of the electric energy to be provided, at least one of the plurality of Consumers which consume the electric energy as an Active Consumer that consumes a predetermined volume of the electric energy, and at least one of a remainder of the plurality of Consumers as a Passive Consumer that adjusts a volume of the electric energy to be consumed, and an instruction processing instructs at least one of Passive Subscribers, which is at least one of either the Passive Producer or the Passive Consumer, to adjust the electric energy, so as to mitigate a difference between a total volume of the electric energy provided by the plurality of Producers and a total volume of the electric energy consumed by the plurality of Consumers.

Advantageous Effects of Invention

According to the exemplary aspects of the present invention, it is possible to provide an electric energy adjustment apparatus, a system, a method and a program that enable the electric energy between a plurality of consumers and providers to be flexibly adjusted.

DESCRIPTION OF EMBODIMENTS

Figure 1:
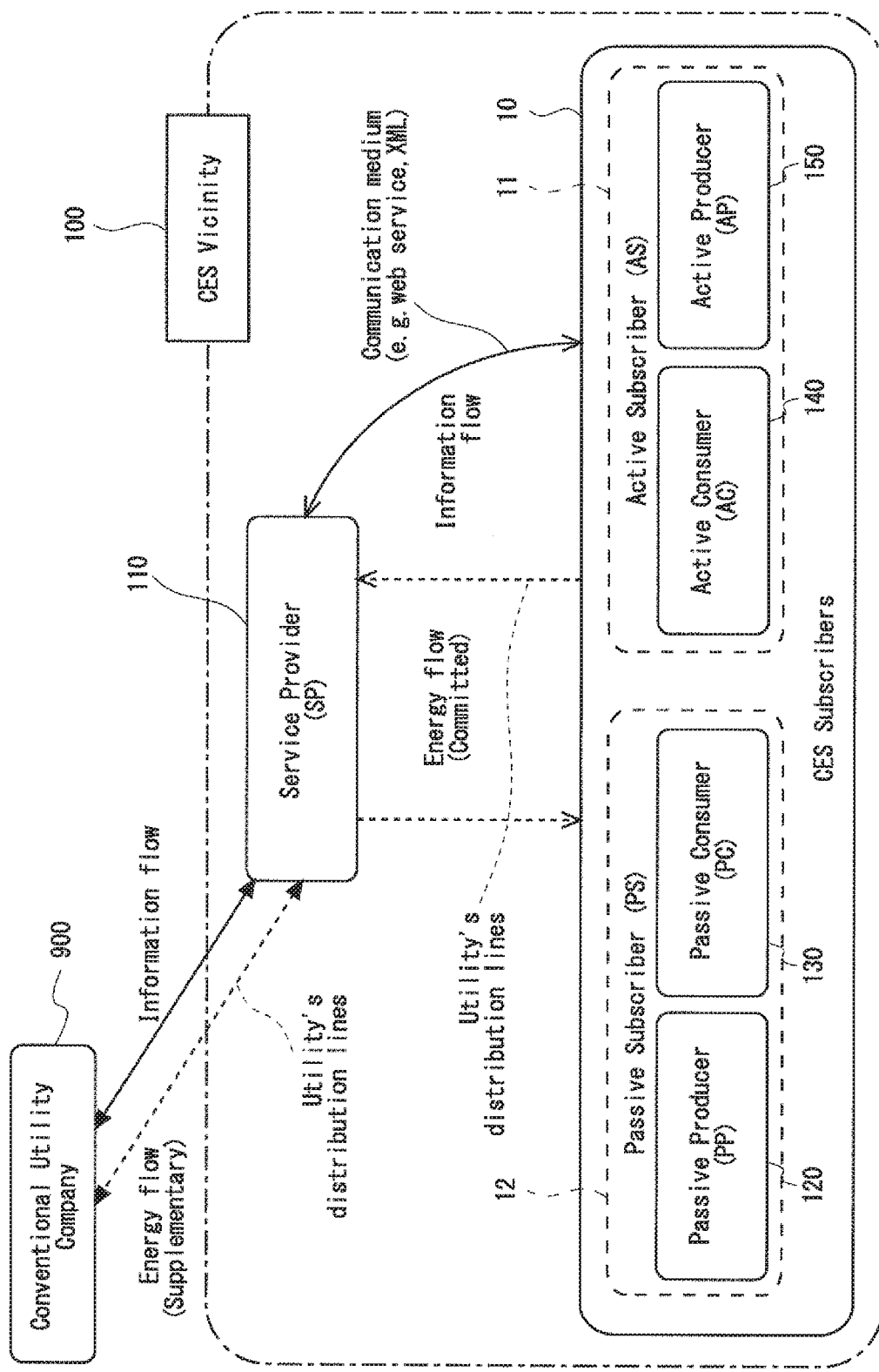
FIG. 1 is a block diagram showing a configuration of an energy adjustment system according to a first exemplary embodiment of the present invention.

Hereinafter, specific exemplary embodiments incorporating the present invention are explained in detail with reference to the drawings. In each drawing, the same components are denoted by the same reference numerals, and duplicated explanations are omitted as necessary for clarity of explanation.

The existing vertically integrated energy market will go through a complete renovation in order to alleviate the electricity market deregulation as well as a proliferation of renewable sources. Moreover, the advancement of ICT and storage technology will enable digital grid (DG-Grid) architecture and operation to soon be realizable in a considerable scale. Such a technological advancement and vision will create a huge business potential, especially in the energy market area. On the other hand, reduction of the energy footprint from a utility grid (or other external suppliers) while utilizing locally available energy (mostly from renewable sources in conjunction with a battery/battery cloud) is necessary to move towards a "net-zero-energy" society. A "net-zero-energy" society is defined as the maximized usage of local energy production to meet local energy consumption so as to move towards nullifying the interaction with a conventional utility grid. The operating zone/region of such a society is thought to be a microgrid or a group of microgrids. A microgrid typically contains a number of load (energy consumers), distributed energy resources with renewable sources (e.g. PV, wind, etc.), and energy storage systems (batteries, etc.) with appropriate infrastructures. The interactions amongst these aforementioned entities coupled with their specific roles are critically important to realizing a "net-zero-society" to a certain extent. Moreover, the economic benefits of entities (especially consumers and energy providers) need to be ensured.

The outline of this invention will be explained as follows.

In one embodiment, the invention is a system for demand-side commitment based energy service (CES) framework that facilitates the aforementioned targets in the background. The CES framework requires defining several new classes of consumers and producers (players) based on their service requirements and engagement willingness. The players' engagements and subscriptions are motivated by defining appropriate incentives (in a form of a pricing scheme) which ensure the benefit of each player compared with the traditional energy service. The pricing scheme is designed such that each subscriber tends to be economically benefited by participating in the CES. By defining the appropriate functionalities of different players of the CES coupled with their interplaying as well as by infusing intelligence in the CES, it is possible to have the local energy production properly managed in accordance with local energy consumption in order to nullify the necessity of utilizing entities like a utility grid or external sources to a certain extent (if not fully).

In another embodiment, the invention is an automated operational outline describing the temporal sequence of operations, pointing out the potential functional blocks and describing different phases of operation. The operational flow is oriented around a Service Provider (SP), the brain of the CES and the host of all required functional blocks with associated intelligence. Based on the service requirements and the capacity, the subscribers of the CES have been divided into several service dependent classes.

In one of the embodiments of the invention, the CES subscribers interplay while cooperating with each other based on their energy profiles. A certain time ahead (N-time) an energy matching operation is required to achieve high-level energy optimization from the service perspective. The intelligence required for the energy matching operation is presented in the SP. A matching engine is thus designed to perform the necessary energy matching operation to optimally match the total supply with the total demand while satisfying the individual consumer's demand and provider's supply. The key objective of the energy matching operation is to reduce the utility grid contribution as well as to respect the preferences of both consumers and providers.

In the N-time-ahead operation, a plurality of energy consumers will report a plurality of energy requirements to the SP describing its energy consumption patterns for a certain granularity of time (e.g. 30-minutes). A plurality of energy providers also reports a plurality of potential energy productions to the SP. If some consumers/providers are unable to report (or contracted to do so), the SP itself predicts their perspective energy consumption/production using a Prediction Engine. After accumulating the energy profiles, a Matching Engine performs the optimal energy matching operation to efficiently match the supply with the demand. Although, the SP tries to maximize the utilization of total supply with total demand within that service region, it might be required to exchange a fraction of energy with the utility in order to maintain a balance between supply and demand in both a certain-time-ahead operation and the real time operation.

<First Exemplary Embodiment of the Invention>

FIG. 1 is a block diagram showing a configuration of an energy adjustment system according to a first exemplary embodiment of the present invention. FIG. 1 describes the demand-side commitment based energy service (CES) framework model outline operating on a specified service zone (CES vicinity 100). The energy adjustment system according to the first exemplary embodiment of the present invention is present in the CES vicinity 100. The energy adjustment system includes a Service Provider (SP) 110 and the CES subscribers 10.

The SP 110 is an example of a control apparatus or an electric energy adjustment apparatus according to the first exemplary embodiment of the present invention. The SP 110 instructs the plurality of Producers and Consumers about the electrical energy (in other words, electric power in the form of energy unit, for example, kWh). The SP 110 acts as the brain of the model and contains major functional modules required for realizing the services. Specifically, The SP 110 may select categories (Active/Passive and/or Producer/Consumer) of each subscriber. The SP 110 may instruct at least one of Passive Subscribers to adjust the electric energy. That is, the SP 110 may send the instruction to the Passive Subscribers, so as to mitigate a difference between a total volume of the electric energy provided by the plurality of Producers and a total volume of the electric energy consumed by the plurality of Consumers. Note that, the Passive Subscribers is at least one of either the Passive Producer or the Passive Consumer.

Figure 2:
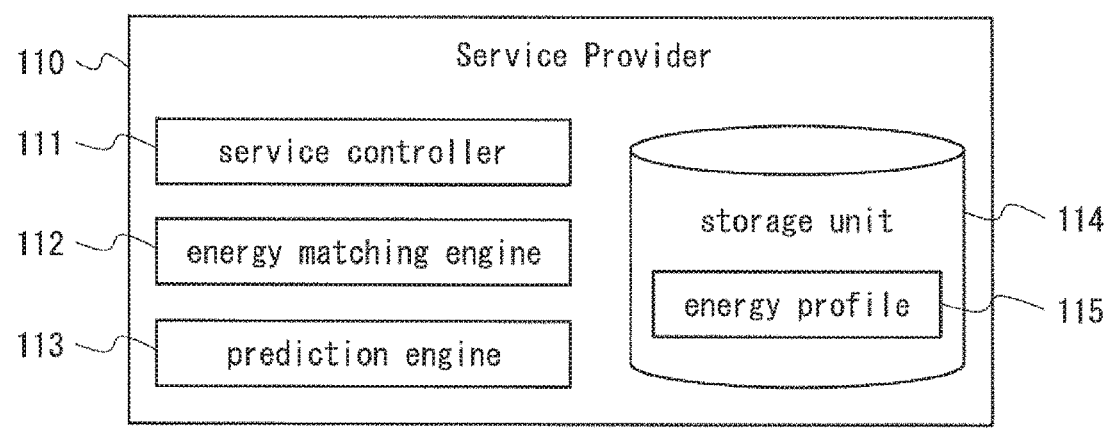
FIG. 2 is a block diagram showing a configuration of a Service Provider according to the first exemplary embodiment of the present invention.

FIG. 2 is a block diagram showing a configuration of the SP 110 according to the first exemplary embodiment of the present invention. The SP 110 is an example of a controller according to the first exemplary embodiment of the present invention. The SP 110 includes a service controller 111, an energy matching engine 112, a prediction engine 113, and a storage unit 114. The storage unit 114 is a storage device. For example, the storage unit 114 may be a nonvolatile storage device. The storage unit 114 includes a plurality of energy profiles 115. The energy profiles 115 are information about demand and supply electric energy obtained in each of the plurality of Producers and Consumers during a certain time period.

When the service controller 111 receives the plurality of energy profiles 115 from one or more CES Subscribers 10, the service controller 111 stores the energy profiles 115 in the storage unit 114. When the service controller 111 does not receive some or all of the energy profiles 115, the service controller 111 may predict the energy profiles 115. In other words, the SP 110 may, at least, possess the energy profiles 115. The service controller 111 (or the prediction engine 113) may determine adjustment values to adjust the electric energy, based on the energy profiles 115. The service controller 111 may instruct at least one of the Passive Subscribers based on at least one adjustment values.

Before the certain time period in Subscribers 10 actually adjust the electric energy, the service controller 111 may determine adjustment values to adjust the electric energy so as to mitigate the difference based on predicted values (for example, the energy profiles 115) of demand and supply electric energy obtained in each of the CES Subscribers 10 during the certain time period. The service controller 111 may instruct at least one of the PS (Passive Subscribers) 12 based on the adjustment values.

The service controller 111 may instruct at least one of the PS 12 to adjust the electric energy during the certain time period. When there is a difference between a total real supply volume which is provided by the plurality of Producers and a total real demand volume which is consumed by the plurality of Consumers during the certain time period, the service controller 111 may instruct at least one of the PS 12 to further adjust the electric energy.

Alternatively, the service controller 111 may receive values of an electric energy volume which is provided by the plurality of Producers and is consumed by the plurality of Consumers during the certain time period. The service controller 111 may instruct at least one of the PS 12 to adjust the electric energy based on the received values of the real electric energy volume.

There is a plurality of time periods for the Passive Subscribers to adjust the electric energy. The service controller 111 may determine adjustment values to adjust the electric energy for each of the certain time periods, so as to mitigate the difference, and instruct at least one of the PS 12 based on the adjustment values. The service controller 111 may select one of the Subscribers as Active and one of the Subscribers as Passive for each of the certain time periods.

The service controller 111 may determine adjustment values to adjust the electric energy, so as to mitigate the difference within the range of the constraints under which the PS 12 are able to adjust the electric energy, and instructs at least one of the PS 12 based on the adjustment values.

The energy matching engine 112 matches energy consumption of consumers with energy supply from producers.

The prediction engine 113 predicts the N-time ahead energy consumption and production prediction. Note that, The SP 110 may include other additional necessary modules.

The CES subscribers 10 are broadly divided into two categories; Producers and Consumers. Each of these two categories is further broken down into two more sub-categories, namely Active and Passive. This breakdown is motivated by the service classifications and roles defined by the SP 110.

The CES subscribers 10 include an Active Subscriber (AS) 11 and a Passive Subscriber (PS) 12. The AS 11 includes at least one Active Consumer (AC) 140 and at least one Active Producer (AP) 150. The PS 12 includes at least one Passive Producer (PP) 120 and at least one Passive Consumer (PC) 130. In other words, the CES subscriber 10 includes a plurality of Producers and Consumers. The plurality of Producers provides electric energy. At least one of the pluralities of Producers is an AP 150 that provides a predetermined volume of the electric energy. At least one of a remainder of the plurality of Producers is a PP 120 that adjusts a volume of the electric energy to be provided. The plurality of Consumers consumes the electric energy. At least one of the pluralities of Consumers is an AC 140 that consumes a predetermined volume of the electric energy. At least one of a remainder of the plurality of Consumers is a PC 130 that adjusts a volume of the electric energy to be consumed.

Figure 3:
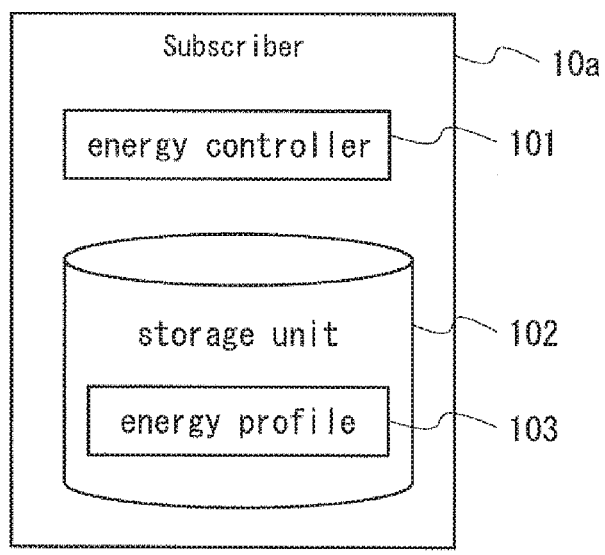
FIG. 3 is a block diagram showing a configuration of a Subscriber according to the first exemplary embodiment of the present invention.

FIG. 3 is a block diagram showing a configuration of a Subscriber 10a according to the first exemplary embodiment of the present invention. The Subscriber 10a is one of the PP 120, PC 130, AC 140, and AP 150. The Subscriber 10a belongs to the CES Subscribers 10. The Subscriber 10a can operate as any category of PP, PC, AC, and AP. Therefore, the configuration of the Subscriber 10a among PP, PC, AC, and AP is the same.

The Subscriber 10a includes an energy controller 101 and a storage unit 102. The energy controller 101 generates its own energy profile 103. The energy controller 101 stores the generated energy profile 103 in the storage unit 102, and sends the generated energy profile 103 to the SP 110. The energy controller 101 receives an adjustment instruction from the SP 110, and provides or consumes the electric energy according to the adjustment instruction. For example, the energy controller 101 may be a smart meter, an information processing apparatus or a computer connected with a power line and communication line.

The envisioned functionalities, characteristics, and received services of the AC 140 can be described as follows.

The AC 140 attains a committed volume of energy for a specific day (or for a certain period of time). The committed volume of energy can be determined by the energy matching engine 112 in the SP 110 after the AC 140 finalizes its energy profiling. The energy profiling of the AC 140 can determined by:

the AC 140 itself using its own prediction mechanisms, a contract or negotiation between the AC 140 and the SP 110 for a pre-determined volume of energy, and the SP 110's prediction engine using the past energy profiling of that AC 140.

Once the commitment deal is conducted, the SP 110 must ensure the volume of energy committed to that particular AC 140 for the contracted time period.

The AC 140 can receive a preference service subjected to a contract with the SP 110. The definition of preference service may vary depending on the SP 110's scope of operation as well as underlying regulations and policies. For example, the AC 140 may want to receive as much power as possible from renewable sources. At the same time, it may also want to receive a certain amount of power from a certain group of producers. The SP 110 tries to respect the preference as much as possible and thus provide the AC with added value for the service. On top of that, an AC can also bid for allocated energy with a certain price. The definitions of precise services are subjected to change depending on the SP 110's own policies coupled with the regulations provided by the regulatory board.

Similarly, the functionalities and characteristics of the AP 150 can be defined as well. The AP 150 generates and provides a committed volume of energy for a specific day (or for a certain period of time). The committed volume of energy can be determined by the energy matching engine 112 in the SP 110 after the AP 150 finalizes its energy profiling.

The PS 12 (the PP 120 and PC 130), on the other hand, are defined by the flexible nature of their energy profiling. The SP 110 can realize programs such as Demand Response (DR) via the PC 130 or PP 120. For instance, if, while scheduling the N-time-ahead energy matching, the SP 110 notices a deficit/surplus of energy, the SP 110 may instruct one (or several) PC(s) 130/PP(s) 120 to reduce their energy consumption/supply (to a predefined volume) in order match the total supply with the total demand. The AS 11 has preliminary committed to the SP 110 to providing/consuming a predetermined volume of the electric energy based on a certain energy profile and services. On the other hand, The PS 12 has not fully committed to the SP 110 (the commitment is flexible) to providing/consuming the predetermined volume of the electric energy. Moreover, the PS 12 is useful while mitigating the real time adjustment of demand and supply, since the SP 110 can utilize their flexibility while mitigating both the N-time ahead supply/demand matching and real-time adjustment. Therefore, the treatment which the PS 12 (the PP 120/PC 130) receives differs significantly from that which the AS 11 (the AP 150/AC 140) receives. Depending on the season, the pattern of energy profiles, and the capability of engagement into the service, a particular subscriber may switch between being a Passive one and an Active one.

Figure 4:
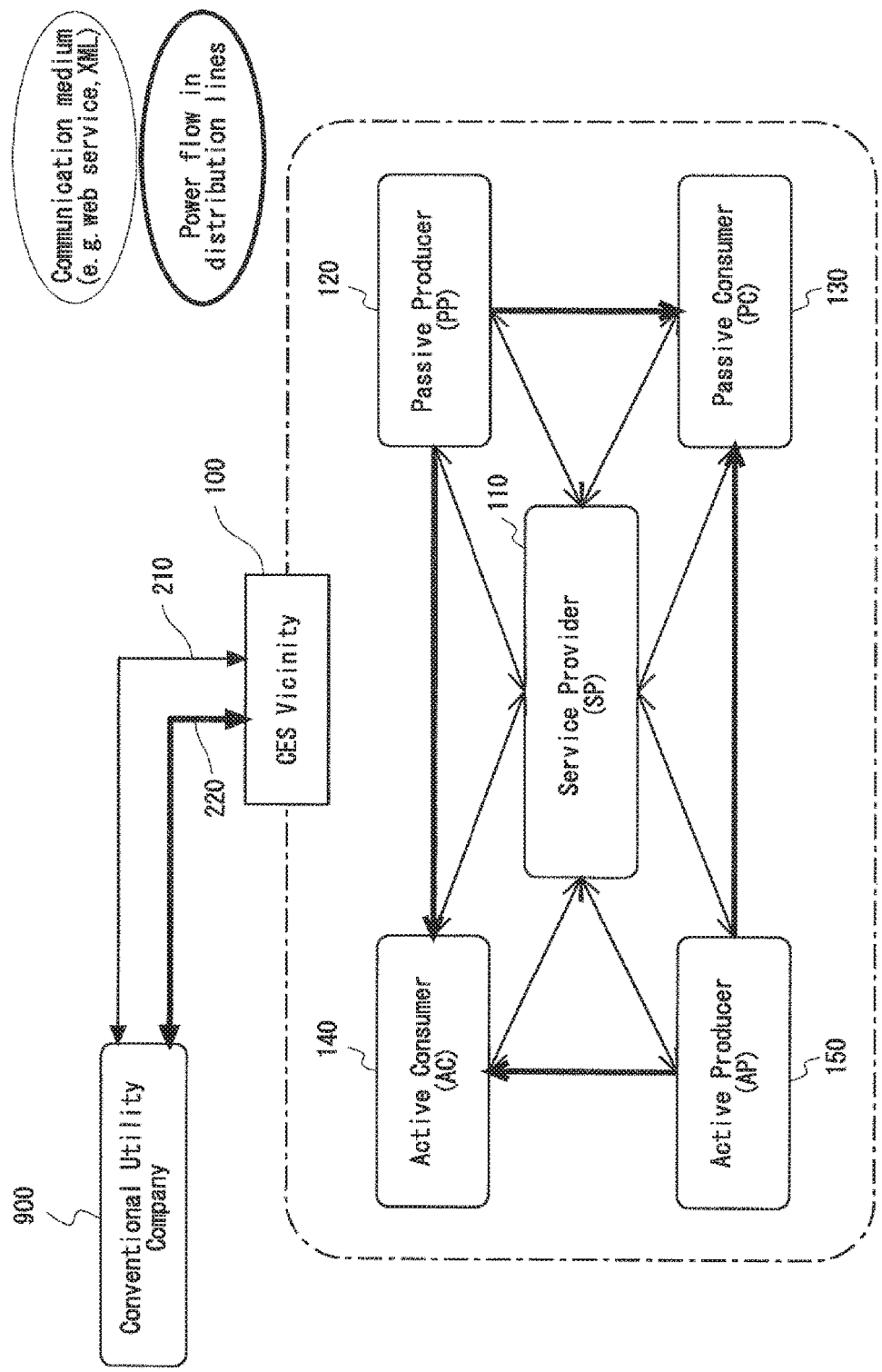
FIG. 4 is a conceptual diagram of the interplays among CES Subscribers with a Service Provider and interaction with the Service Provider and a Conventional Utility Company.

FIG. 4 is a conceptual diagram of the interplaying among the CES Subscribers 10 with the SP 110 and interaction with the SP 110 and Conventional Utility Company 900. As seen in FIG. 4, the CES does not impose any extra electrical network connectivity. Rather, the CES operates on the electrical grid network 220 provided by the conventional utility Company 900. The SP 110 controls all the required operations and intelligence. In case of a real time operation (will be described in FIGS. 8 and 9); the actual power will be transmitted from a producer (Active and Passive) to a consumer (Active and Passive). The SP 110 determines the necessary energy matching volume and broadcasts the information about what amount of energy should be transmitted, from which producer the amount should be transmitted, and to which consumer the amount should be transmitted by the communication line 210. The communication line 210 is bi-directional since the CES subscribers also provide the information regarding their real time energy consumption (for Consumers) and real time energy supply (for Producers) in order to perform the real time adjustment operation using batteries and Passive Subscribers. Moreover, the utility interaction (with the conventional utility Company 900) is also bi-directional since the SP 110 may buy the required energy from the conventional utility Company 900 or sell the surplus of energy to the conventional utility Company 900.

Figure 5:
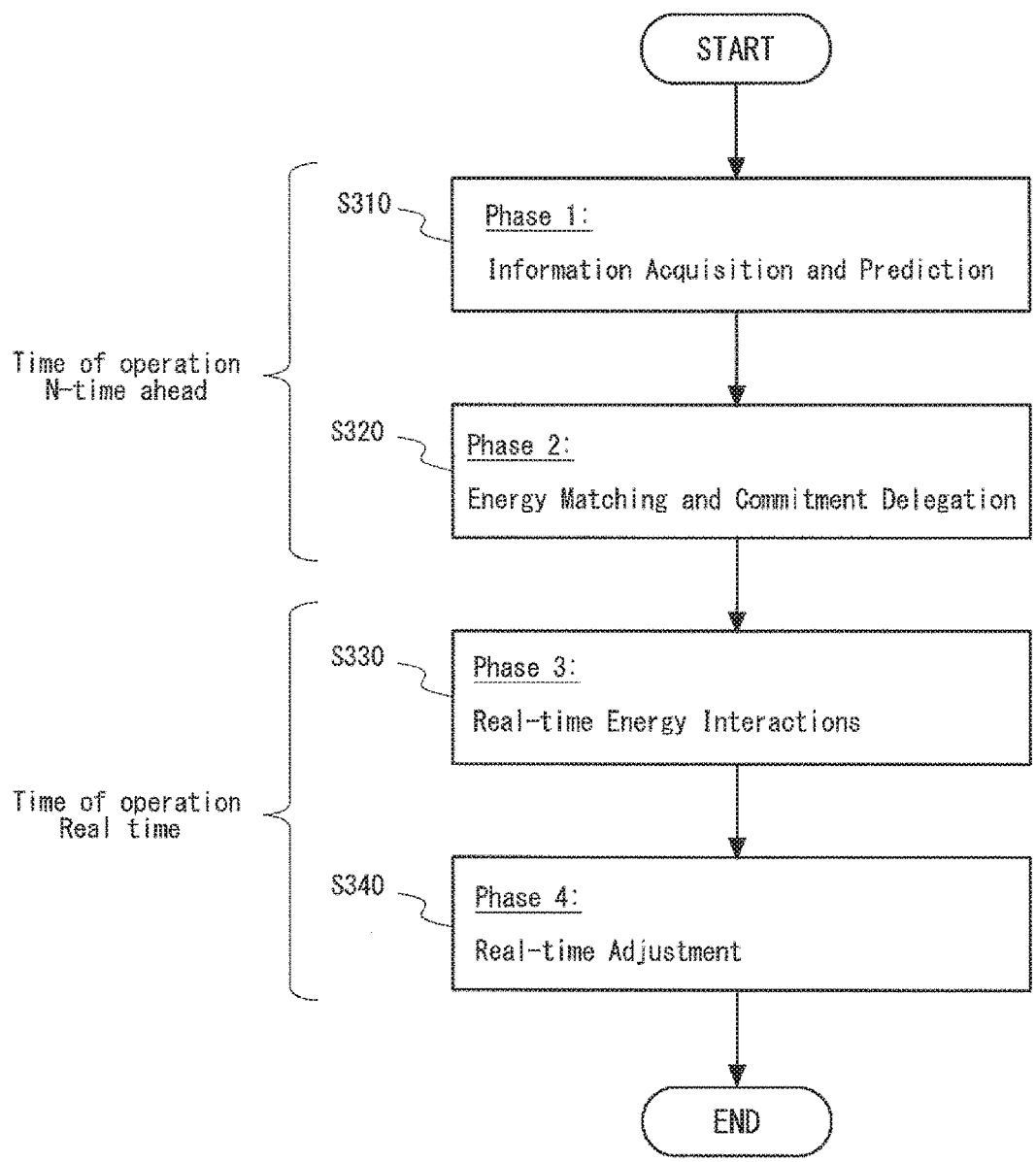
FIG. 5 is a flowchart showing a flow of a process in an energy adjustment method according to the first exemplary embodiment of the present invention.

FIG. 5 is a flowchart showing a flow of a process in the energy adjustment method according to the first exemplary embodiment of the present invention. The whole operation (process) is divided into four chronological phases: Phase 1: Information Acquisition and Prediction (S310), Phase 2: Energy Matching and Commitment Delegation (S320), Phase 3: Real-time Energy Interactions (S330), and Phase 4: Real-time Adjustment (S340). Note that, the Phases 1 and 2 are performed at a time of operation N-time ahead, and the Phases 3 and 4 are performed at a real operation time.

Figure 6:
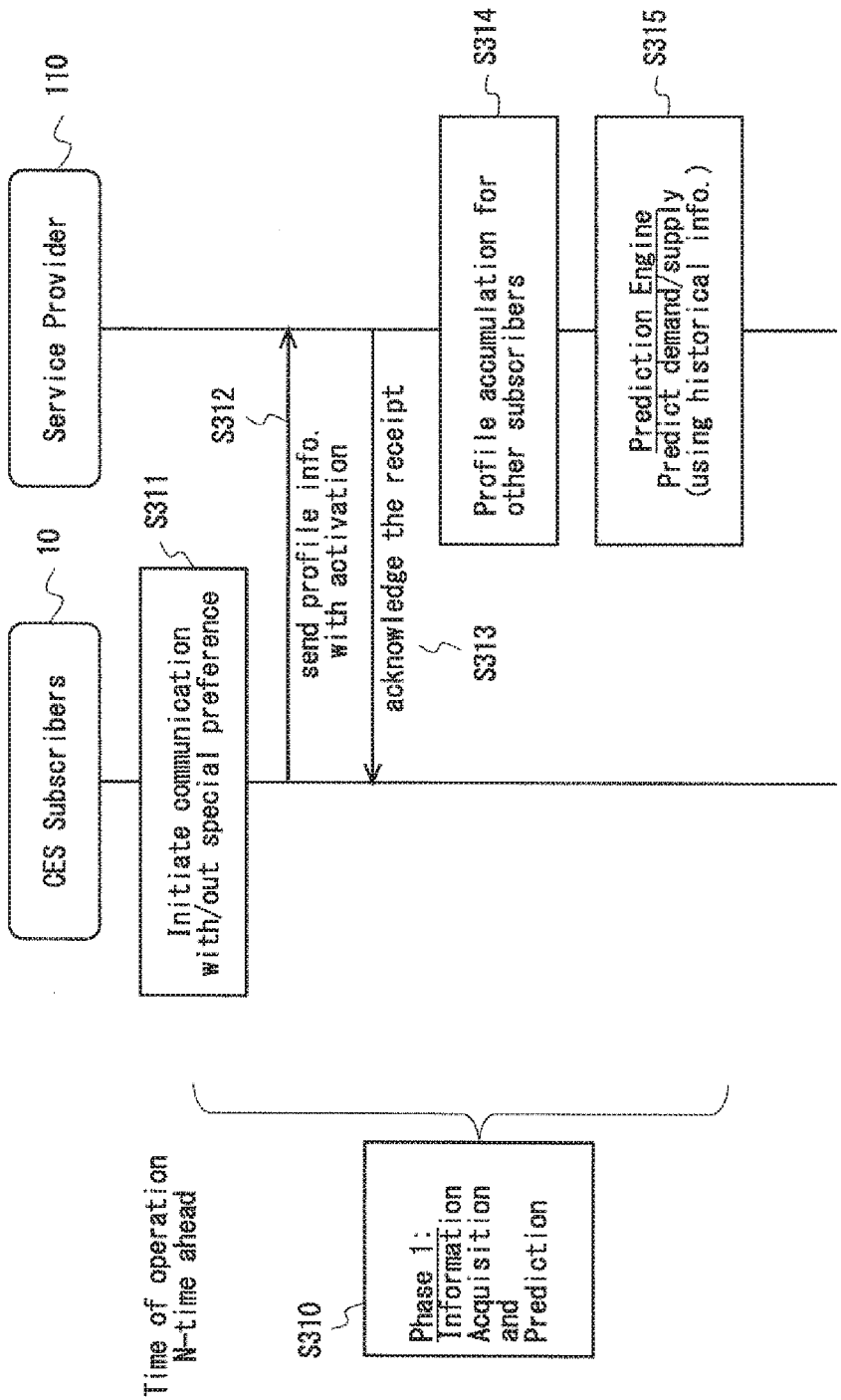
FIG. 6 is a sequence diagram showing a flow of Phase 1 in the energy adjustment method according to the first exemplary embodiment of the present invention.

FIG. 6 is a sequence diagram showing a flow of Phase 1 in the energy adjustment method according to the first exemplary embodiment of the present invention.

In Phase 1 (executed in an N-time ahead operating time, e.g. day-ahead operation), each of the CES Subscribers 10 initiate communication with/out special preference (S311). Specifically, each subscriber generates its own energy profile 103. Each subscriber sends the generated energy profile 103 (profile information) with activation to the SP 110 (S312). When the SP 110 receives the profile information, the SP 110 acknowledges the receipt (S313). Then the SP 110 accumulates the profile information regarding demand and supply of energy from subscribers (S314). Specifically, the SP 110 stores the received energy profile in the storage unit 114. In other words, the SP 110 gathers the energy profile from the perspective subscribers (assuming the subscribers are able to predict their own energy usage a certain time ahead of operation, e.g. N-time ahead). When the SP 110 does not receive some or all of the energy profiles from some or all of the CES Subscribers 10, the SP 110 deploys its own prediction engine 113 to predict the energy profiles 115 for certain subscribers from which the energy profile is not received (S315). Based on the predicted energy consumption/supply and preferences; the SP 110 determines the pre-engaged demand/supply of the subscribers. Subscribers, such as producers of bulk energy may have contracts with the SP 110 regarding the energy volume. In such a case, no energy profile prediction is required. Some other subscribers may want to provide their own energy requirements, instead of providing historical information for prediction. Based on the service definitions and designed policies, the SP 110 can provide several preference program to the certain subscribers.

Figure 7:
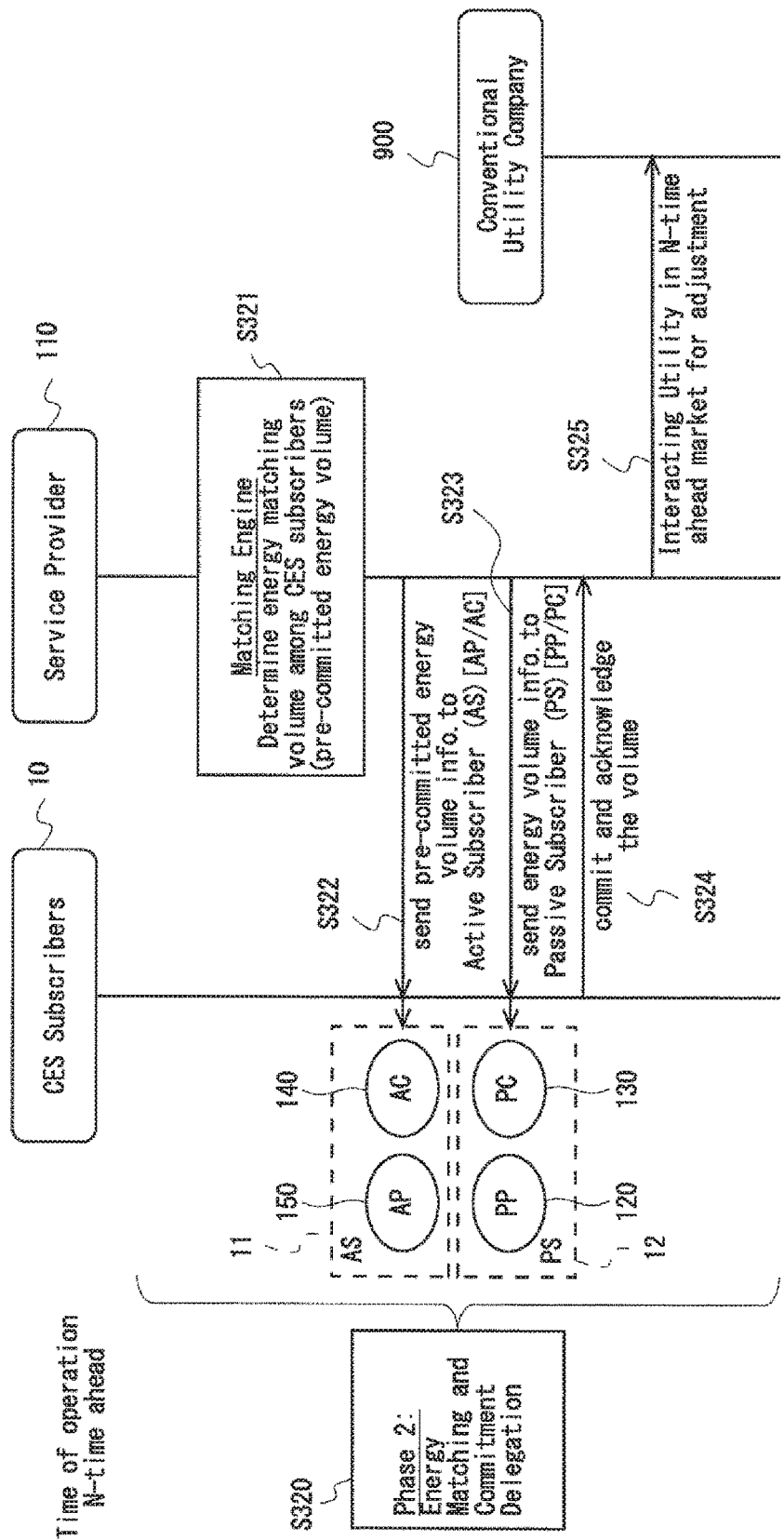
FIG. 7 is a sequence diagram showing a flow of Phase 2 in the energy adjustment method according to the first exemplary embodiment of the present invention.

FIG. 7 is a sequence diagram showing a flow of Phase 2 in the energy adjustment method according to the first exemplary embodiment of the present invention. In Phase 2 (executed also in an N-time ahead operating time), the SP 110 determines the energy matching volume among CES subscribers 10 (pre-committed energy volume) (S321). Specifically, the SP 110 determines the energy matching by intelligently assigning Active/Passive Producers to supply energy to Active/Passive Consumers. In other words, the SP 110 selects each subscriber as an Active/Passive and a Producer/Consumer. And the SP 110 determines an association with Active/Passive Producers and Active/Passive Consumers and a volume of supply/demand electric energy. The SP 110 sends the pre-committed energy volume information to the AS 11 (the AP 150 and AC 140) (S322). The SP 110 sends the adjusted energy volume information to the PS 12 (the PP 120 and PC 120) (S323). At this time, the SP 110 may notify each subscriber of the determined (selected) categories (Active/Passive and Producer/Consumer). Further, the SP 110 may display which subscriber is selected as an Active/Passive and a Producer/Consumer, the energy matching volume (a total supply/demand volume, an adjusted volume, or the like), a status of subscribers, price of energy, or the like on the screen. The determination of categories may be dependent on the subscription type and/or required service and/or some demand criteria. For example, a particular consumer can be an AC 140 since it can provide better price for require energy to the SP 1140. After step S323, the PS 12 commits and acknowledges the volume (S324).

When the SP 110 does not mitigate the difference between the total supply/demand volumes among CES subscribers 10, the SP 110 interacts with the Conventional Utility Company 900 in N-time ahead for adjustment (S325).

The motivation of the energy matching operation is to achieve several objectives, such as minimizing the involvement of an utility grid or some other external energy source (the Conventional Utility Company 900), respecting the preference of consumers (if given), and respecting the flexibility provided by the Passive Subscriber. At the same time, the energy matching engine should be able to satisfy the energy demand profile of Active Consumers (exact satisfaction) and Passive Consumers (within certain degree of satisfaction).

Figure 10:
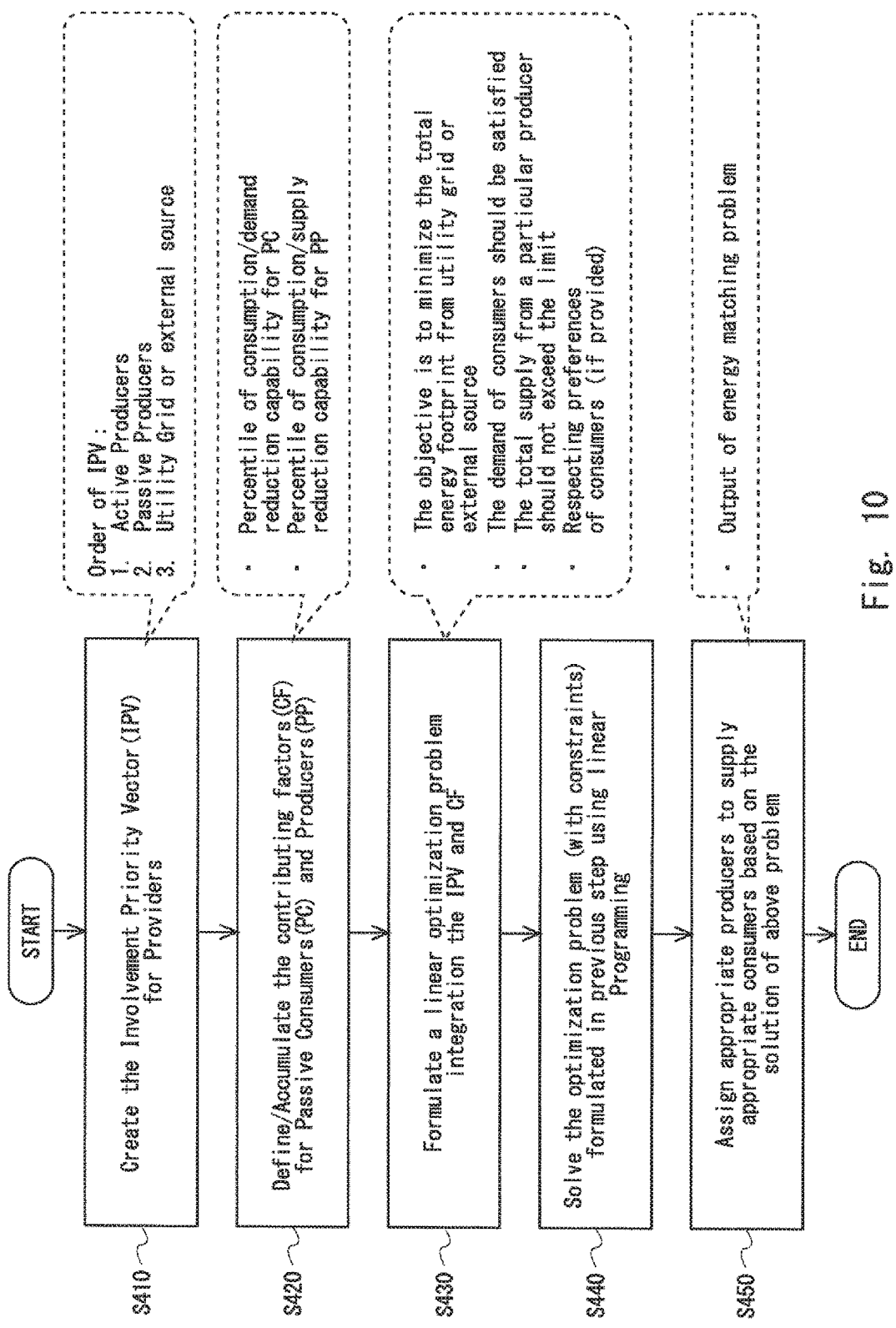
FIG. 10 is a flowchart showing an example of applying the linear programming to the energy matching procedure according to the first exemplary embodiment of the present invention.

The energy matching problem can be effectively formulated as an assignment problem and solved by a linear programming based method. FIG. 10 is a flowchart showing an example of applying linear programming to the energy matching procedure according to the first exemplary embodiment of the present invention. The step S410 shows the initialization of the process by prioritizing the producers depending on the involvement preferences. The energy matching engine 112 creates the Involvement Priority Vector (IPV) for Providers. The IPV is thus defined by assigning appropriate priorities to the producers. Two layers of IPV are applied in the step S410. In the higher level, Active Producers (APs 150) are set as the highest priority producers, since the SP 110 has to ensure the maximum energy supply from APs 150. Then the Passive Producers (PPs 120) are set as the 2nd highest priority producers, since the SP 110 has flexibility over deciding the energy volume required from them. Finally, the utility grid or other external sources (the Conventional Utility Company 900) is set as the lowest priority producers, since the SP 110 is moving towards nullifying the contributions from the utility grid (or other external sources). In the lower level of IPV, additional priority values can be assigned to each of the APs 150 and PPs 120 to implement some fairness policies amongst them. This level of IPV can provide more control to the SP 110 over deciding the energy matching volume more precisely. The exact numerical values of IPV for each of the subscribers have to follow both the higher and lower level of priority rules.

In 2nd step S420, the contributing factors (CFs) for the Passive Subscribers (the PP 120 and PC 130) are determined. In other words, the CFs are defined or accumulated. The CFs represent the maximum level of flexibility allowable to the SP 110 while utilizing the energy profiles of the PS 12. Specifically, the SP 110 determines a percentile of consumption/demand reduction capability for the PC 130. The SP 110 determines a percentile of consumption/demand reduction capability for the PP 120.

In the 3rd step S430, a linear programming (LP) formulation is conducted using IPV and CF. If some preferences of the AC 140/PC 130 are provided, the LP formulations also incorporate the preference list. The objectives of the LP formulation are to minimize the energy transactions (the total energy footprint) from a utility grid or external source while respecting the IPV, CF and the preferences provided by the AC 140/PC 130. The usual constraints of the LP formulations are the total demand satisfaction of the AC 140

(exact) and the AP 150 (fractional, based of CF). That is, the demand of consumers should be satisfied, and the total supply from a particular producer should not exceed the limit.

The LP problem is solved in the step S440. That is, the SP 110 solve the optimization problem (with constraints) formulated in the previous step using linear Programming. After the step S440, the SP 110 assigns appropriate producers to supply appropriate consumers based on the solution of the above problem (S450). The outcome of the matching engine is the energy assignment among the AP 150/PP 120 to the AC 140/PC 130.

The result of the matching engine (information of pre-committed energy volume) will be broadcasted to the appropriate AP 150/AC 140/PP 120/PC 130. At the end of the Phase 2 (FIG. 7), the unavoidable energy transactions with a utility grid will be performed in the N-time ahead market.

Figure 8:
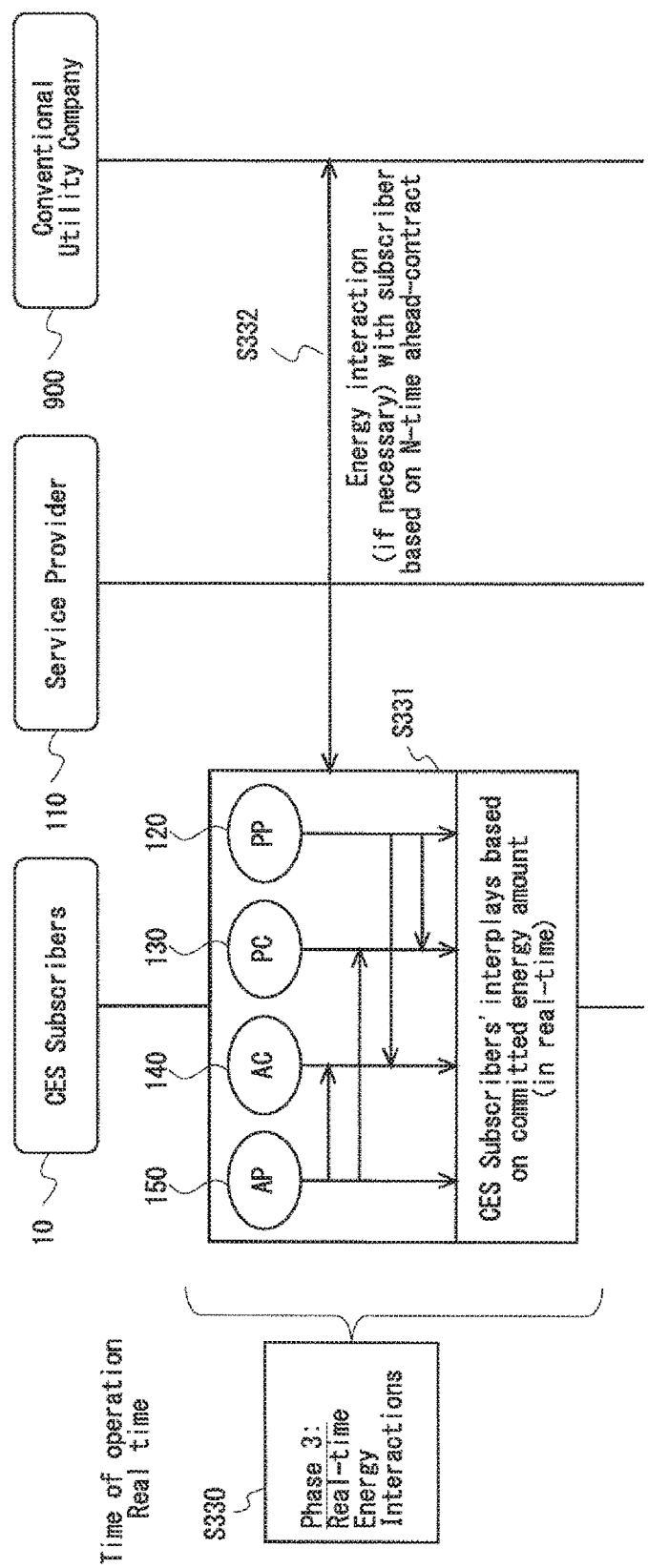
FIG. 8 is a sequence diagram showing a flow of Phase 3 in the energy adjustment method according to the first exemplary embodiment of the present invention.

FIG. 8 is a sequence diagram showing a flow of Phase 3 in the energy adjustment method according to the first exemplary embodiment of the present invention. The real time energy exchange operation starts with Phase 3 (S330). Based on the energy matching operation decided N-time ahead in Phase 2 (S320), the real time energy is exchanged among the AC 140/AP 150, the PC 130/PP 120 and the utility grid (if necessary). That is, the CES Subscribers 10 interplay with each other based on the committed energy amount (in real-time) (S331). Further, if necessary, the Conventional Utility Company 900 performs the energy interaction (if necessary) with CES Subscribers 10 based on N-time ahead-contract (S332).

Figure 9:
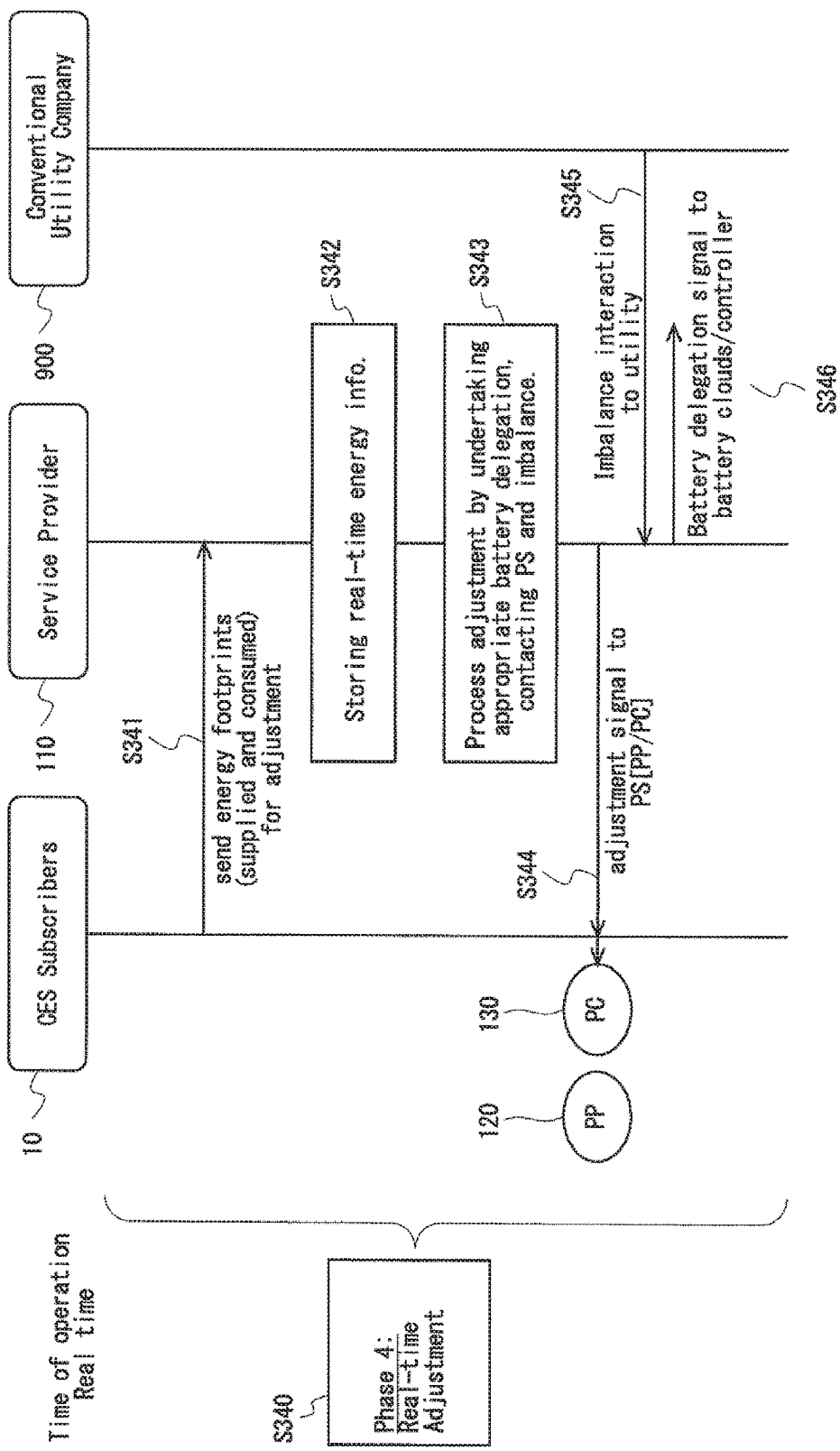
FIG. 9 is a sequence diagram showing a flow of Phase 4 in the energy adjustment method according to the first exemplary embodiment of the present invention.

FIG. 9 is a sequence diagram showing a flow of Phase 4 in the energy adjustment method according to the first exemplary embodiment of the present invention. Using the communication link, after a certain interval, the CES subscribers 10 send their real time energy foot-prints (supplied and consumed) to the SP 110 as Phase 4 (S340) starts. The SP 110 stores real-time information in the storage unit 114 (S342). In this Phase 4, the adjustment required for mitigating the difference between real-time supply and real-time demand takes place. In other words, the SP 110 processes the adjustment by undertaking appropriate battery delegation, contacting the PS 12. In order to adjust, the SP 110 may request a set of certain PS 12 to adjust their demand/supply. That is, the SP 110 sends an adjustment signal to the PS 12 (the PP 120/PC 130). Moreover, the SP 110 can also initiate battery delegation in association with a battery cloud to fix the above difference (S346). If the difference is still not fixed even after battery delegation and incorporation of Passive Subscribers, the SP 110 interacts with the imbalance market to nullify the difference (S345).

Figure 11:
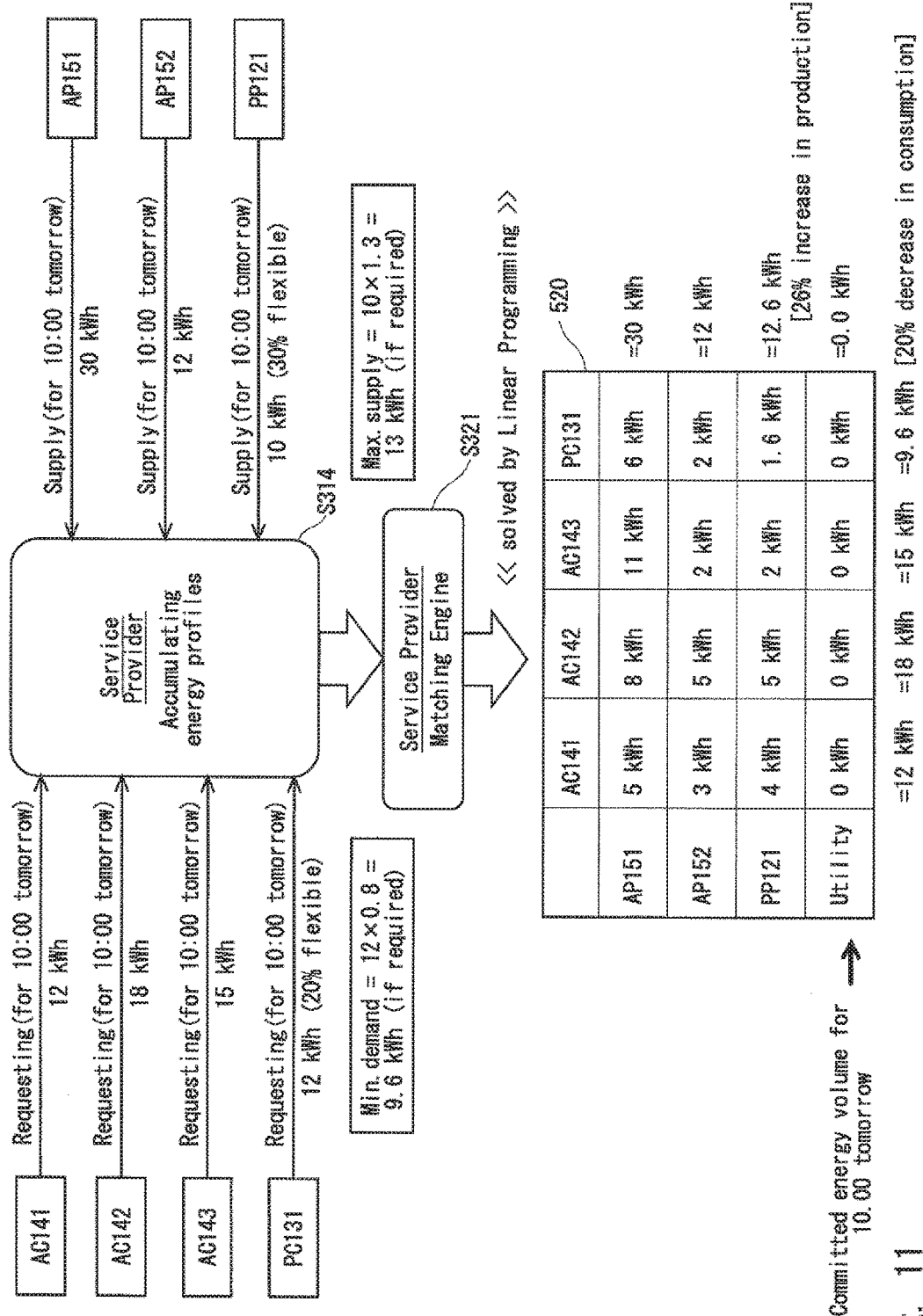
FIG. 11 is a simple exemplary energy matching procedure according to the first exemplary embodiment of the present invention.

FIG. 11 is a simple exemplary energy matching procedure according to the first exemplary embodiment of the present invention. FIG. 11 shows a simple exemplary energy matching procedure among 3 Active Consumers (AC) 141 to 143, 1 Passive Consumer (PC) 131, 2 Active Producers (AP) 151 and 152, and 1 Passive Producer (PP) 121 for a day-ahead operation (according to N-time ahead operation). The energy matching will be conducted at 10 AM on the next day. This example assumes that the consumers and producers are able to provide their own energy profiling. Therefore, the prediction engine 113 is not in action.

The Passive subscribers (PC 131 and PP 121) can adjust the electric energy within the range of their flexibility of 20% and 30%, respectively. In the case of the PC 131, 20% flexibility refers to the reduction of demand down to 20% (i.e. if the SP 110 instructs the PC 131 to bring down the demand from 12 kWh to 9.6 kWh, the PC 131 will consume 9.6 kWh). And, in case of the PP 121, 30% flexibility refers to the increase in production up to 30% (i.e. if the SP 110 instructs to increase the production from 10 kWh to 13 kWh, the PP 121 will provide 13 kWh). (Note that, finally, the PP 121 provides 12.6 kWh.)

After the SP 110 accumulates all the requested and potential supply quantity of energy from consumers and producers (S314), respectively, the energy matching operation is started. The process of solving the energy matching problem (the assignment problem) using linear programming (S321) is described in FIG. 10. Finally, the SP 110 calculated as shown table 520. The table 520 summarizes the energy transactions among consumers and producers.

It is noted that the total supply is between 52 kWh to 55 kWh (with the flexibility of the PP 121) and the total demand is 57 kWh (can be reduced to 54.6 kWh with the flexibility of the PC 131). In the ideal case with no flexibility (i.e. demand is 57 kWh and supply is 52 kWh), the utility (electric energy) will be required to provide additional 5 kWh to nullify the gap between supply and demand.

However, the SP 110 utilized the flexibility of passive customers and zeros the utility interaction by instructing the PC 131 to reduce the consumption down to 20% and the PP 121 to increase the production up to 26% (within 30% flexibility). The resultant table can be read as (e.g. row 1); AP #1 is committed to provide 5, 8, 11 and 6 kWh to AC #1, AC #2, AC #3, and PC #1, respectively at 10 AM tomorrow. The same way, column 2 can be read as; the AC 142 is committed to receive 8, 5, 5 kWh of energy from the AP 151, the AP 152 and the PP 121, respectively and to receive no energy from the utility. The decision on energy matching can have multiple optima (i.e. multiple solutions can be achievable while realizing the same objective).

However, depending on criteria such as the preferences (such preference may be, e.g. the AC 141 prefers the AP 151 over the AP 152 to provide a higher fraction of requested energy), fairness policy (such policy may be, e.g. the SP 110 provides certain advantage to the AC 141 while respecting the AC 141's preference), etc., a single solution can be attainable. These features can be included while designing specific services and the disclosed invention can be served as an interface or framework.

In the real time operation, however, the SP 110 might ask passive customers (that contain the flexibility unused in the day-ahead operation) to adjust the real time demand-supply gap. For instance, in the present example, the PP 121 can increase the production slightly (4%) in the real time operation (possibly by utilizing the operating reserve).

<Other Exemplary Embodiments of the Invention>

The present invention relates to a System and Operation of a Demand Side Commitment based Energy Service Framework. The present invention is in the general field of designing of an energy service framework for demand-side energy management that it is envisioned will be applied to a particular electricity distribution (demand-side) area. More particularly, the present invention is in the technical field of energy service design by defining appropriate players and subscribers, their functionalities, interplaying and cooperation, and an overall operation to realize an efficient automated trading amongst local energy producers and local energy consumers oriented towards minimizing dependency on a utility grid (or external energy sources).

Those skilled in the art will recognize that the system, operation and method of the present disclosure may be implemented in several manners and as such are not to be limited by the foregoing embodiments and examples. In other words, functional elements being performed by single or multiple components in various combinations of hardware, software or firmware may be distributed among software applications in the server side (the SP side). Furthermore, the embodiments of the methods presented in the flowchart in this disclosure are provided by way of example in order to provide a more complete understanding of the technology. Alternative embodiments can be contemplated wherein the various components can be altered functionally in order to attain the same goals. Although, various embodiments have been described for the purposes of this disclosure, such embodiments should not be deemed to limit the teaching of this disclosure to those embodiments. Various changes and modifications may be made to the elements and operations described above to obtain a result that remains within the scope of the systems and operations described in this disclosure.

Additionally, it is obvious that the present invention is not limited by the above exemplary embodiments but various modifications can be made thereto without departing from the scope of the already mentioned present invention. For example, the above exemplary embodiments explained the present invention as being a hardware configuration, but the present invention is not limited to this. The present invention can also be realized by causing a CPU (Central Processing Unit) to execute arbitrary processes on a computer program. In this case, the program can be stored and provided to a computer using any type of non-transitory computer readable media.

Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray(registered trademark) Disc), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

REFERENCE SIGNS LIST

100 CES Vicinity
110 Service Provider (SP)
10 CES Subscribers
106a Subscriber
Active Subscriber (AS)
Passive Subscriber (PS)
120 Passive Producer (PP)
130 Passive Consumer (PC)
140 Active Consumer (AC)
150 Active Producer (AP)
111 service controller
112 energy matching engine
113 prediction engine
114 storage unit
115 energy profile
101 energy controller
102 storage unit
103 energy profile
210 communication line
220 electrical grid network
121 Passive Producer
131 Passive Consumer
141 Active Consumer
142 Active Consumer
143 Active Consumer
151 Active Producer
152 Active Producer
520 table
900 Conventional Utility Company

The invention claimed is:

1. An electric energy adjustment apparatus comprising:
at least one memory storing instructions, and
at least one processor configured to execute the instructions to:
cause a service provider to interact with a utility company, the interacting including:
instructing a plurality of Producers and Consumers about electrical energy, the Producers providing the electric energy, and the Consumers consuming the electric energy,
selecting either an Active Producer or a Passive Producer as a category for each of the plurality of Producers, the Active Producer providing a predetermined volume of the electric energy, and the Passive Producer adjusting a volume of the electric energy to be provided, and select either an Active Consumer or a Passive Consumer as a category for each of the plurality of Consumers, the an Active Consumer consuming a predetermined volume of the electric energy, and the Passive Consumer that adjusting a volume of the electric energy to be consumed, and
instructing at least one of Passive Subscribers, which is at least one of either the Passive Producer or the Passive Consumer, to adjust the electric energy, so as to mitigate a difference between a total volume of the electric energy provided by the plurality of Producers and a total volume of the electric energy consumed by the plurality of Consumers.

2. The electric energy adjustment apparatus according to claim 1, wherein the at least one processor is further configured to execute the instructions to:
receive values of an electric energy volume which is provided by the plurality of Producers and is consumed by the plurality of Consumers during a certain time period, and
instruct instructs the at least one of the Passive Subscribers to adjust the electric energy based on the received values of the electric energy volume.

3. The electric energy adjustment apparatus according to claim 1, wherein the at least one processor:
instructs at least one of the Passive Subscribers to adjust the electric energy during a certain time period, and
when there is a difference between a total real supply volume which is provided by the plurality of Producers and a total real demand volume which is consumed by the plurality of Consumers during the certain time period, instructs at least one of the Passive Subscribers to further adjust the electric energy.

4. The electric energy adjustment apparatus according to claim 1, wherein the at least one processor is further configured to execute the instructions to:
before a certain time period in which the plurality of the Producers and the Consumers actually adjust the electric energy, determine adjustment values to adjust the electric energy so as to mitigate the difference based on predicted values of demand and supply electric energy obtained in each of the plurality of the Producers and the Consumers during the certain time period, and instruct at least one of the Passive Subscribers based on the adjustment values.

5. The electric energy adjustment apparatus according to claim 1, wherein the at least one processor:

possesses profiles about demand and supply electric energy obtained in each of the plurality of the Producers and the Consumers during a certain time period, determines adjustment values to adjust the electric energy, based on the profiles, and instructs the at least one of the Passive Subscribers based on the adjustment values.

6. The electric energy adjustment apparatus according to claim 1, wherein there are a plurality of time periods for the Passive Subscribers to adjust the electric energy, and the at least one processor:

determines adjustment values to adjust the electric energy for each of the time periods, so as to mitigate the difference, and instructs the at least one of the Passive Subscribers based on the adjustment values.

7. The electric energy adjustment apparatus according to claim 6, wherein the at least one processor selects one of the pluralities of the Producers and the Consumers as Active and one of the pluralities of the Producers and the Consumers as Passive for each of the time periods.

8. The electric energy adjustment apparatus according to claim 1, wherein the at least one processor:

determines adjustment values to adjust the electric energy so as to mitigate the difference within a range of constraints under which the Passive Subscribers are able to adjust the electric energy, and instructs the at least one of the Passive Subscribers based on the adjustment values.

9. An electric energy adjustment method using a plurality of Producers that provide electric energy, a plurality of Consumers that consume the electric energy and a controller that instructs the plurality of the Producers and the Consumers about the electrical energy, the method comprising:

causing, by the controller, a service provider to interact with a utility company, the interacting including:

selecting, by the controller, either an Active Producer or a Passive Producer as a category for each of the plurality of Producers, the Active Producer providing a predetermined volume of the electric energy, and the Passive Producer adjusting a volume of the electric energy to be provided, and selecting, by the controller, either an Active Consumer or a Passive Consumer as a category for each of the plurality of Consumers, the Active Consumer consuming a predetermined volume of the electric energy, and the Passive Consumer adjusting a volume of the electric energy to be consumed; and instructing, by the controller, at least one of Passive Subscribers, which is at least one of either the Passive Producer or the Passive Consumer, to adjust the electric energy, so as to mitigate a difference between a total volume of the electric energy provided by the plurality of the Producers and a total volume of the electric energy consumed by the plurality of the Consumers.

10. A non-transitory computer readable medium storing a control program that, when executed by a computer, causes the computer to:

cause a service provider to interact with a utility company, the interacting including:

selecting either an Active Producer or a Passive Producer as a category for each of a plurality of Producers which provide electric energy, the Active Producer providing a predetermined volume of the electric energy, the Passive Producer adjusting a volume of the electric energy to be provided, and selecting either an Active Consumer or a Passive Consumer as a category for each of the plurality of Consumers which consume the electric energy, the Active Consumer consuming a predetermined volume of the electric energy, and the Passive Consumer adjusting a volume of the electric energy to be consumed, and instructing at least one of Passive Subscribers, which is at least one of either the Passive Producer or the Passive Consumer, to adjust the electric energy, so as to mitigate a difference between a total volume of the electric energy provided by the plurality of the Producers and a total volume of the electric energy consumed by the plurality of the Consumers.

* * * * *